United States Patent
DeBoisblanc

(12) 
(10) Patent No.: US 6,439,274 B1
(45) Date of Patent: Aug. 27, 2002

(54) POWER OR MECHANICALLY DRIVEN APPARATUS FOR ADDING FLUIDS TO CHARGED SYSTEMS

(76) Inventor: Lonny Jay DeBoisblanc, 964 Ettin Ave., Simi Valley, CA (US) 93065

( * ) Notice: Subject to any disclaimer, the term of this patent is extended or adjusted under 35 U.S.C. 154(b) by 0 days.

(21) Appl. No.: 09/707,651

(22) Filed: Nov. 7, 2000

(51) Int. Cl.$^7$ ................................................ B65B 1/04
(52) U.S. Cl. ........................ 141/67; 141/94; 222/158; 222/390
(58) Field of Search .............................. 141/67, 94, 95; 222/158, 319, 251, 326, 386, 390, 387

(56) References Cited

U.S. PATENT DOCUMENTS

| | | | |
|---|---|---|---|
| 80,307 A | * | 7/1868 | Reeve |
| 1,574,279 A | * | 2/1926 | Davis |
| RE20,852 E | * | 9/1938 | Butler |
| 2,563,930 A | * | 8/1951 | Hamann et al. |
| 4,467,620 A | | 8/1984 | Bradley et al. |
| 5,444,988 A | | 8/1995 | Eden |
| 5,826,636 A | | 10/1998 | Trigiani |

* cited by examiner

Primary Examiner—Steven O. Douglas
(74) Attorney, Agent, or Firm—Scott W. Kelley; Kelly Bauersfeld Lowry & Kelley LLP

(57) ABSTRACT

An apparatus for adding fluids to charged systems includes a cylinder having a first end cap attached to a first end thereof and a second end cap removably attached to a second end thereof. A driving nut is formed at an exterior end of a rod which extends through an aperture of the first end cap and attaches to a piston at an interior end thereof. The piston engages the cylinder to form a variable volume reservoir within the cylinder. A hose assembly extends through the second end cap so as to be in fluid communication with the variable volume reservoir. A handle, or alternatively a power tool socket, may be detachably connected to the driving nut for extending the rod into or retracting the rod out from the cylinder to adjust the variable volume reservoir within the cylinder. The cylinder may be transparent and include graduated markings for determining the amount of fluid within the variable volume reservoir at any given time.

10 Claims, 1 Drawing Sheet

POWER OR MECHANICALLY DRIVEN APPARATUS FOR ADDING FLUIDS TO CHARGED SYSTEMS

BACKGROUND OF THE INVENTION

The present invention relates to the field of pressurized fluid systems. More particularly, the present invention relates to an apparatus for charging a fluid system with an appropriate fluid.

Pressurized fluid systems are very common in the industrialized society. All such systems are similar in that they are pressurizable, closed systems. As such, the systems generally operate optimally within a certain pressure range. If the internal pressure falls below this range, the system needs to be "recharged" with the appropriate fluid.

Some systems, for example, air conditioning/refrigeration coolant lines, are designed to remain closed during use. Theoretically, these systems should not require recharging because they should not loose nor consume their contents. In practice, however, the internal pressure inside such systems tends to drop over time due to leakage, however minor, or degradation/decomposition of the pressurized material. Accordingly, the systems commonly require periodical recharging. Some systems, such as automotive air conditioning systems, can be recharged at the on-site operation using more sophisticated tools. However, other systems must be recharged off-site with limited tooling.

Oftentimes, these systems require that a certain amount of fluid within a given range be present in the system at any time. Excessive fluid can actually damage some systems due to the accompanying increase in pressure within the system. It is difficult using presently available charging apparatuses to determine the amount of fluid that is being added to the system. Aside from the concern of adding too much fluid, the attempt to add an excessive amount of fluid may result in overspill and fluid waste. Some of these fluids, such as refrigerant and refrigerant oils, are relatively expensive and add to the cost of servicing the charged system.

Accordingly, there is a need for a apparatus for adding fluids to charged systems which allows the user to readily determine the amount of fluid that has been added to the system. What is also needed is such an apparatus that can be operated by a handle when out in the field or alternatively by power tools when those are readily accessible. The present invention fulfills these needs and provides other related advantages.

SUMMARY OF THE INVENTION

The present invention resides in an apparatus for adding fluids to charged systems. The apparatus includes a cylinder having a first cap attached to a first end thereof. A second cap is removably attached to a second end of the cylinder. A threaded rod has a portion extending through and engaging a threaded aperture of the first cap. The rod includes a driving nut formed at an exterior end thereof. Typically, the driving nut is in the form of a hex nut. An interior end of the rod is disposed within the cylinder. A piston is attached to the interior end of the rod and engages the cylinder to form a variable volume reservoir within the cylinder. Preferably, the cylinder is transparent and includes graduated markings for determining the amount of fluid within the variable volume reservoir at any given time.

A hose assembly is in fluid communication with the variable volume reservoir and extends through the second cap. The hose assembly typically includes a flexible hose and a charging port adapter at an end thereof opposite the second cap.

The apparatus includes a handle detachably connectable to the driving nut for adjusting the position of the piston. Alternatively, a socket attachment of a power tool may be engaged with the driving nut in order to rotate the rod and adjust the position of the piston within the cylinder.

Use of the present invention is advantageous over similar devices in that the user of the apparatus can see through the transparent cylinder and easily gauge, using the graduated markings on the cylinder, the amount of fluid within the variable volume reservoir at any given time. Also, the user is not limited to use of the detachable handle, but may conveniently connect a power tool to the driving nut of the rod to more speedily charge the system in question.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawing illustrates the invention. In such drawing:

DETAILED DESCRIPTION OF THE PREFERRED EMBODIMENT

Figure 1:
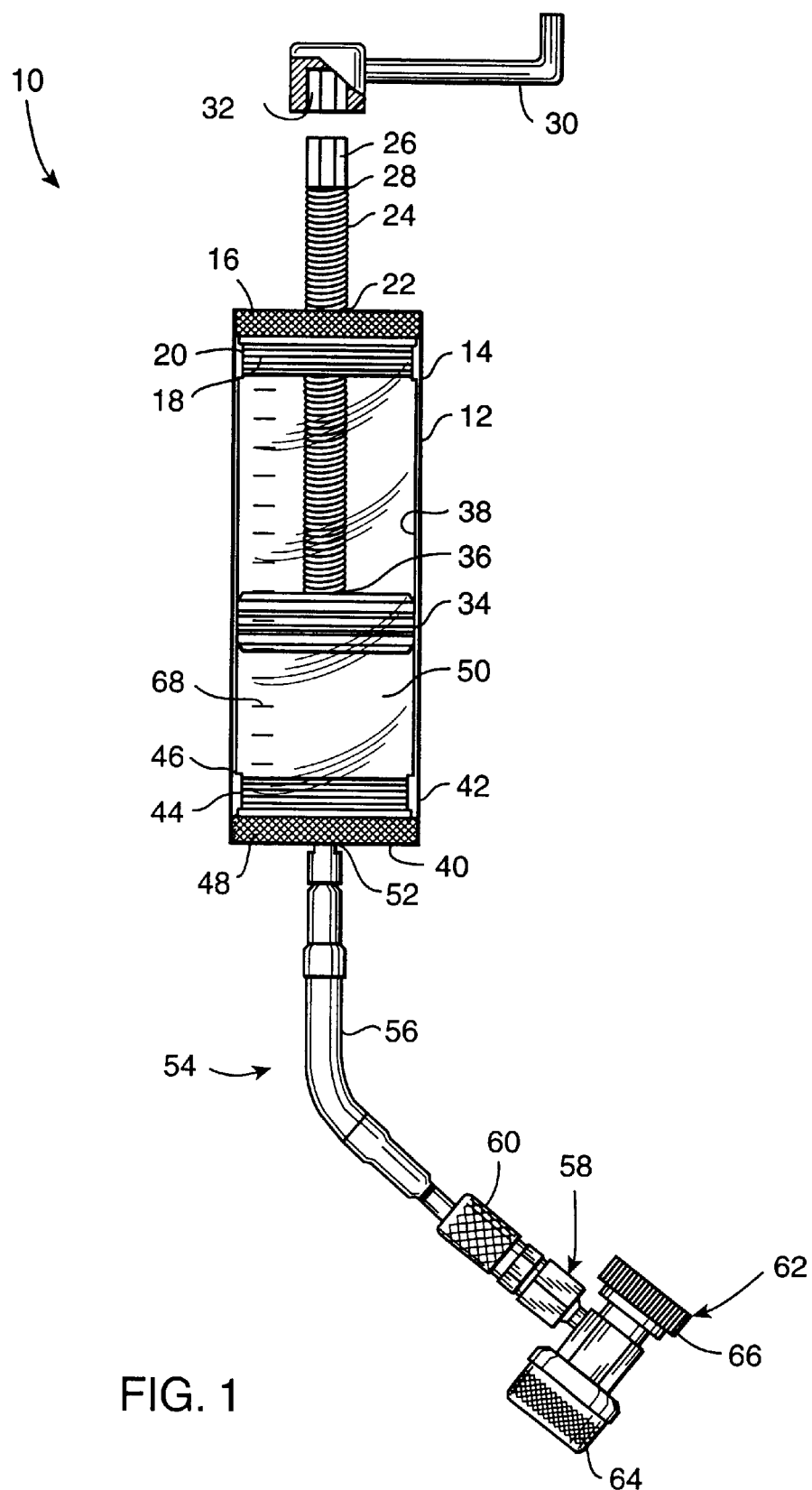
FIG. 1 is a partially fragmented elevational view of an apparatus for adding fluids to charged systems embodying the present invention.

As shown in the drawings for purposes of illustration, the present invention is concerned with an apparatus 10 for adding fluids to charged systems. The apparatus 10 can be used in a variety of charged systems, but is typically used in pressurized systems such as automotive air conditioning systems. The apparatus 10 includes a cylinder 12 which is preferably transparent so that the contents thereof can be readily seen, although the cylinder can be comprised of a non-transparent material as well. A first end 14 of the cylinder 12 is closed off by a first cap 16. Although the first cap 16 is illustrated as having a threaded portion 18 received within interior threads 20 of the first end 14, it is to be understood that the first cap 16 can also be formed with or otherwise permanently attached to the first end 14 so long as a tight seal is formed. The first cap 16 includes a threaded aperture 22, typically centrally aligned in the first cap 16.

An externally threaded screw rod 24 extends through and engages the threaded aperture 22 of the first cap 16. The rod 24 is typically of greater length than the cylinder 12. A driving nut 26 is formed on an exterior end 28 of the rod 24. Although the driving nut 26 can include as few as one planar surface, the driving nut typically comprises a ¼ hex nut. A detachable handle 30 includes a internal socket 32 which mates with the driving nut 26 of the rod 24. The handle 30 can be attached to the driving nut 26 in order to raise and lower the screw rod 24 within the cylinder 12 as will be further described herein. Use of the handle 30 is desirable when the technician is away from the shop and on-site or removed from power sources. When the technician is within the shop or has access to electrical outlets or an air compressor, electric or pneumatically driven power tools can be used with an appropriate socket to engage the driving nut 26 and rotate the screw rod 24 into and out of the cylinder 12. A piston 34 is attached to the interior end 36 of the rod 34. The piston 34 is configured such so as to engage an inner surface of the cylinder 12 and form a seal therebetween. The piston 34 travels the length of the cylinder 12 in response to the turning of the screw rod 24.

A second end cap 40 is removably attached to the second end 42 of the cylinder 12. Typically, the second end cap 40 includes an externally threaded portion 44 which engages inner threads 46 of the second end of the cylinder 42. An external rim 48 of the second end cap 40 can be stamped or otherwise textured to increase gripping during rotation of the second end cap 40 to facilitate removal and tightening thereof. The piston 34 and second end cap 40 cooperatively define a reservoir 50 within the cylinder 12 which varies in volume according to the positioning of the piston 34.

The second end cap 40 includes an aperture 52 through which a hose assembly 54 extends. The hose assembly 54 is in fluid communication with the reservoir 50. The assembly 54 includes a flexible hose 56 extending from the second cap 40. A charging port adapter 58 is attached at an end of the hose 56 opposite the second cap 40.

The charging port adapter 58 can be of various forms. In a particularly preferred embodiment, the charging port adapter is for use in automotive air conditioning systems. In such an embodiment, a swivel 60 releasably attaches an R-134A assembly 62 to an end thereof. The R-134A assembly 62 includes a snap-fit clamp 64 which attaches onto a low-side port of an automotive air conditioning system. A screw handle 66 can be turned for opening or closing the Schrader-type valve connection. The swivel 60 can be actuated to release the R-134 A adapter assembly 62 when the automotive air conditioning system is an R-12 system. The swivel 60 can be used as a female fitting of a Schrader-type valve depressor in such circumstances. Other adapters 58 can be used for the particular purpose at hand. An advantage of using the flexible hose 56 is that either the low-side or high-side of the charging system port can be readily accessed as compared to devices having a fixed or stiff hose assembly.

In use, the piston 34 is advanced or retracted to a position which forms the desired reservoir 50. For instance, if six ounces of fluid are to be added, the piston would be placed at the appropriate position. However, if only two ounces of fluid are to be added, the piston 12 will be extended further into the cylinder 12 so that the reservoir 50 only holds two ounces. Graduated markings 68 are provided on the surface of the transparent cylinder 12 so that the technician can easily make these determinations. The second cap 40 is then removed and the fluid is added to the reservoir 50. The second cap 40 is then reattached to the cylinder 12 and the piston is advanced into the cylinder 12 until a small amount of fluid exits the charging port adapter 58. This done in order to purge any air between the fluid within the reservoir 50 and the charging port adapter 58. Introducing air into pressurized systems can adversely affect the balancing of the pressure therein. After purging, the adapter 58 is attached to the system to be charged and the screw rod 24 is rotated, for example in a clockwise rotation, to move the piston towards the second cap and add fluid to the system. The amount of fluid that has been added can be easily determined by viewing the fluid contents within the transparent cylinder 12 and reading the graduated markings 68 thereon. As described above, the screw rod 24 can be threaded into and out of the cylinder 12 using either the detachable handle 30 or a socket attachment of a power tool (not shown). It is to be appreciated that the piston 34 can be directly attached to the screw rod and rotate with the screw rod as it travels through the cylinder 12. Alternatively, the interior end 36 of the screw rod 24 can be attached to the piston 34 by means of a swivel so that the piston 34 does not rotate but merely travel along the length of the cylinder 12 in a sliding fashion.

Although an embodiment has been described in detail for purposes of illustration, various modifications may be made without departing from the scope and spirit of the invention. Accordingly, the invention is not to be limited, accept as by the appended claims.

What is claimed:

1. An apparatus for adding fluids to charged systems, comprising:
   a hand-held cylinder;
   a first cap attached to a first end of the cylinder and having a threaded aperture therethrough;
   a second cap removably attached to a second end of the cylinder for adding fluid into the cylinder;
   a rod having a portion extending through and engaging the threaded aperture, and an interior end disposed within the cylinder;
   a piston attached to the interior end of the rod and engaging the cylinder to form a variable volume reservoir within the cylinder; and
   a driving nut formed at an exterior end of the rod for detachably connecting an handle or wrench socket to move the piston within the cylinder.

2. The apparatus of claim 1, wherein the cylinder is at least partially transparent.

3. The apparatus of claim 2, wherein the cylinder includes graduated markings for determining the amount of fluid within the variable volume reservoir at any given time.

4. The apparatus of claim 1, wherein the driving nut comprises a hex nut.

5. The apparatus of claim 1, including a hose assembly in fluid communication with the variable volume reservoir and extending through the second cap.

6. The apparatus of claim 5, wherein the hose assembly includes a flexible hose and a charging port adapter at an end thereof opposite the second cap.

7. An apparatus for adding fluids to charge systems, comprising:
   a hand-held cylinder that is at least partially transparent;
   a first cap attached to a first end of the cylinder and having a threaded aperture therethrough;
   a second cap removably attached to a second end of the cylinder for adding fluid into the cylinder;
   a rod having a portion extending through and engaging the threaded aperture, and an interior end disposed within the cylinder;
   a piston attached to the interior end of the rod and engaging the cylinder to form a variable volume reservoir within the cylinder;
   a driving nut formed at an exterior end of the rod for detachably connecting a handle or wrench socket to move the piston within the cylinder; and
   a hose assembly in fluid communication with the variable volume reservoir and extending through the second cap;
   wherein the cylinder includes graduated markings for determining the amount of fluid within the variable volume reservoir at any given time.

8. The apparatus of claim 7, wherein the driving nut comprises a hex nut.

9. The apparatus of claim 7, wherein the hose assembly includes a flexible hose and a charging port adapter at an end thereof opposite the second cap.

10. An apparatus for adding fluids to air conditioning systems, comprising:
    a transparent hand-held cylinder;
    a first cap attached to a first end of the cylinder and having a threaded aperture therethrough;

a second cap removably attached to a second end of the cylinder;

a rod having a portion extending through and engaging the threaded aperture, and an interior end disposed within the cylinder;

a piston attached to the interior end of the rod and engaging the cylinder to form a variable volume reservoir within the cylinder;

a driving nut formed at an exterior end of the rod for detachably connecting a handle or wrench socket to move the piston within the cylinder; and a hose assembly in fluid communication with the variable volume reservoir and extending through the second cap, the hose assembly including a flexible hose and a charging port adapter at an end thereof opposite the second cap;

wherein the cylinder includes graduated markings for determining the amount of fluid within the variable volume reservoir at any given time.

\* \* \* \* \*